United States Patent

Poleshuk et al.

[11] Patent Number: 5,981,886
[45] Date of Patent: Nov. 9, 1999

[54] MULTIFUNCTION SWITCH ASSEMBLY

[75] Inventors: LeRoy A. Poleshuk, White Lake; Jeffrey K. Wiersing, Walled Lake; Owen D. Winkler, Westland; James B. Wright, Sterling Heights, all of Mich.

[73] Assignee: UT Automotive Dearborn, Inc., Dearborn, Mich.

[21] Appl. No.: 08/993,847

[22] Filed: Dec. 18, 1997

[51] Int. Cl.$^6$ .................................................. H01H 9/00
[52] U.S. Cl. .................................. 200/61.39; 200/61.27; 200/61.54
[58] Field of Search ............................... 200/4, 5 R, 6 R, 200/11 R–11 G, 6 B–6 C, 16 R, 16 C, 17 R, 18, 61.27, 61.39, 61.54, 61.85, 61.88, 504, 572, 332, 335

[56] References Cited

U.S. PATENT DOCUMENTS

| | | | |
|---|---|---|---|
| 3,356,817 | 12/1967 | Matthews | 200/166 |
| 4,387,279 | 6/1983 | Brevick | 200/61.54 |
| 4,920,239 | 4/1990 | Buhler et al. | 200/61.54 |
| 4,942,273 | 7/1990 | Furuhashi et al. | 200/61.54 |
| 5,701,660 | 12/1997 | Javery et al. | 29/622 |
| 5,780,794 | 7/1998 | Uchiyama et al. | 200/61.54 |

Primary Examiner—Michael A. Friedhofer
Attorney, Agent, or Firm—Howard & Howard

[57] ABSTRACT

A multifunction switch assembly includes a secondary detent system for a contactor carrier. The multifunction switch assembly generally comprises a rotatable knob mounted on an outer end of a handle. The knob rotatably drives a shaft extending toward an inner end of the handle. A contactor carrier is linearly driven by a gear on the inner end of the shaft. The electrical contactor includes an indexing arm which is biased against a plurality of detents formed on a base.

17 Claims, 6 Drawing Sheets

MULTIFUNCTION SWITCH ASSEMBLY

BACKGROUND OF THE INVENTION

The present invention relates to a multifunction switch assembly for a vehicle, and more particularly to a secondary detent system for a multifunction switch assembly.

Multifunction switch assemblies in vehicles typically include a handle which operates turn signals and high beam headlights. A knob is typically rotatably mounted on the outer end of the handle for operating the windshield wiper and wash functions. In one known design, the knob is secured to the other end of a shaft passing through the handle. Rotation of the knob relative to the handle causes rotation of the shaft. A gear at an inner end of the shaft engages a rack on a contactor carrier. Rotation of the knob and shaft causes linear displacement of the contactor carrier, thereby moving an electrical contactor relative to one or more electrical terminals, thereby selectively activating different windshield wipers functions. A plurality of detent fingers are spring biased inwardly from the knob against a plurality of detents on the handle. Graphical indicia adjacent the knob indicate the rotational position of the knob relative to the handle and, ideally, the function activated by the corresponding position of the contactor relative to the terminals. However, there is a large amount of tolerance stackup between the knob and the contactor and relatively little travel between positions of the contactor. As a result, the graphics adjacent the knob may indicate that the knob is in one rotational position corresponding to a first electrical function while the contactor is actually in a different position activating a different electrical function.

SUMMARY OF THE INVENTION

The present invention provides a multifunction switch assembly with a secondary detent system for the rotatable knob and contactor carrier. Generally, a secondary detent system is provided for the carrier such that the carrier is moved to one of a plurality of discrete positions, each of which correspond to one of the discrete rotational positions of the knob. As a result, the accuracy of the position of the carrier and contactor relative to the rotational position of the knob is improved.

Preferably, the secondary detent system includes a plurality of detents which are integrally molded into the base in which the terminals are insert-molded. The electrical contactor preferably includes an integral indexing arm which is biased toward the detents. The electrical contactor is preferably insert molded with the contactor carrier. Forming the indexing arm from the electrical contactor itself improves the positional accuracy of the secondary detent system with respect to the relative positions of the contactor and terminals.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
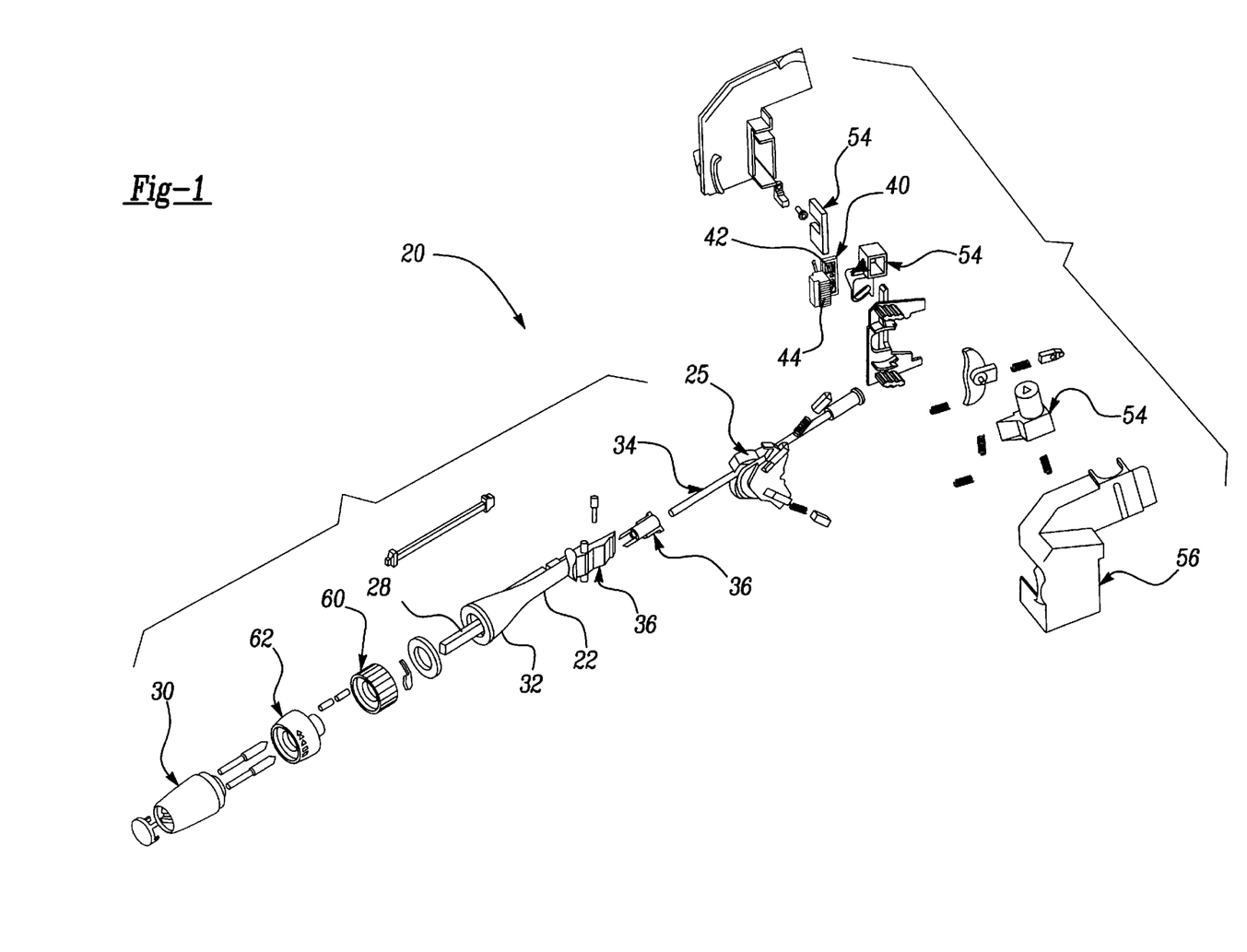
FIG. 1 exploded perspective view of the multifunction switch assembly of the present invention.

A multifunction switch assembly 20 according to the present invention is shown in an exploded perspective view in FIG. 1. The multifunction switch assembly 20 generally includes a handle 22 mounted at an inner end 24 to an actuator pivotally mounted in a base 26. A hollow shaft 28 passes through the handle 22. A knob 30 is rotatably mounted at an outer end 32 of handle 22 around the hollow shaft 28. An inner shaft 34 is rotatably mounted within the handle 22 and is secured to the knob 30. A gear 36 is mounted to an inner end of the shaft 34, such that the gear 36 and shaft 34 are rotatably driven by the knob 30 relative to the handle 22.

The multifunction switch assembly 20 further includes a contactor carrier 40. A metal electrical contactor 42 is insert-molded with the carrier 40. A rack 44 complementary to the gear 36 is molded into the carrier 40. A plurality of terminals 50 are preferably insert-molded into an interior surface 48 of the base 26. The terminals 50 are sized, shaped and arranged in a manner well known in the art to cooperate with the contactor 42 to provide one of a plurality of vehicle functions in each of a plurality of positions of the contactor 42 relative to the terminals 50. Miscellaneous other components of the multifunction switch assembly 20, such as other contactor carriers 54 are generally known and are illustrated for completeness, but for purposes of clarity will not be described. A housing 56 secures to the base 26 generally enclosing the inner end 24 of the handle 22, as well as the carrier 40 and interior surface 48 of the base 26.

The multifunction switch assembly 20 is shown in its preferred embodiment to include a rear wash ring 60 rotatably mounted on the handle 22 inwardly of the knob 30, for actuation of a rear wiper and wash function. A control ring 62 is mounted between the rear wash ring 60 and knob 30 and is non-rotatable relative to the handle 22. The control ring 62 and wash ring 60 are optional and the knob 30 could alternatively be mounted immediately adjacent the handle 22.

Figure 2:
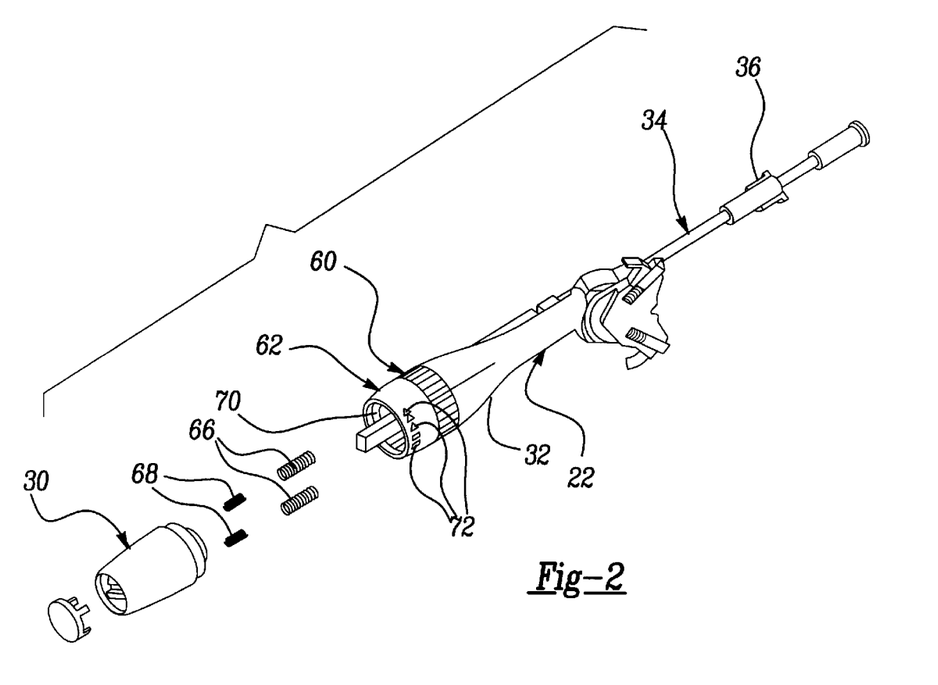
FIG. 2 is assembled perspective view of the handle and control knob of FIG. 1.

In FIG. 2, the control ring 62 and rear wash ring 60 are shown assembled to the handle 22. A plurality of detent fingers 66 are biased by springs 68 from the inner end of the knob 30 towards detents 70 formed on the outer end of the control ring 62. The control ring 62 further includes indicia or graphics 72 which visually indicate electrical vehicle functions (e.g. fast wipe, slow wipe, intermittent wipe, off) corresponding to the rotational position of the knob 30 relative to the control ring 62. Preferably, each of the graphics 72 corresponds to one of the detents 70 for each of the detent fingers 66, such that when the detent finger 66 is in one of the detents 70, the corresponding graphic 72 is indicated. As can be seen in FIG. 2, the gear 36 is secured to the shaft 34, such that rotational displacement of the knob 30 causes rotation of the shaft 34 and gear 36.

Figure 3:
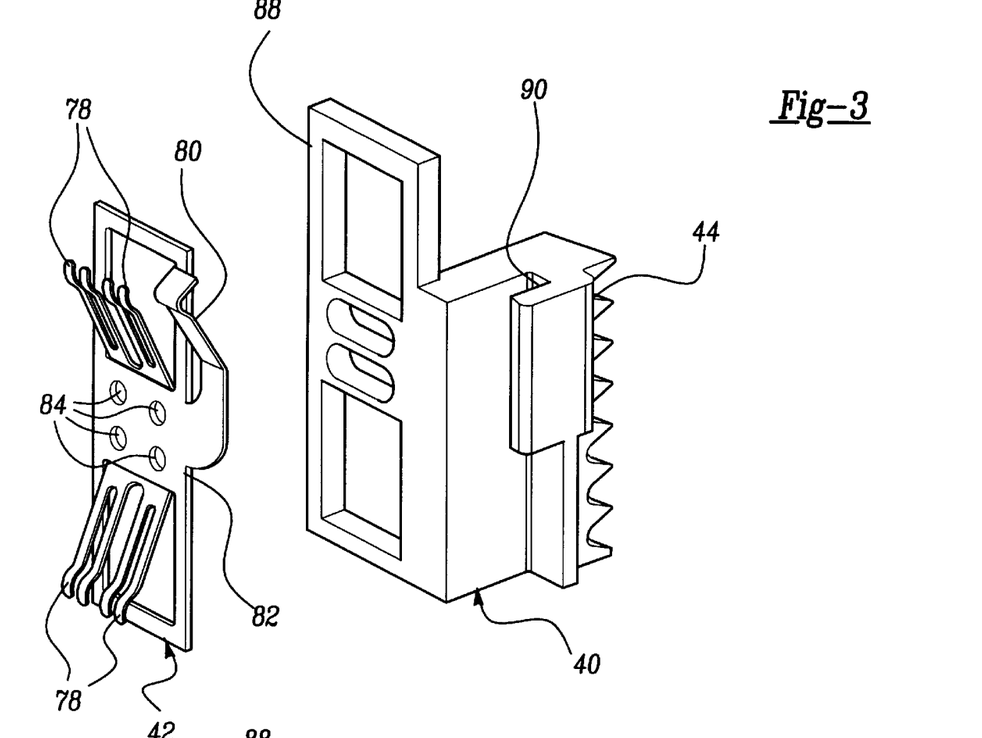
FIG. 3 is an exploded perspective view of the electrical contactor and contactor carrier of FIG. 1.

FIG. 3 is an exploded perspective view of the carrier 40 and contactor 42. The contactor 42 is preferably copper and is blanked and formed to include a plurality of contactor arms 78 and an indexing arm 80 angled outwardly from a frame 82. A plurality of apertures 84 are formed in the frame 82. The carrier 40 is molded to include a frame 88 and a guide 90 opposite the rack 44.

Figure 4:
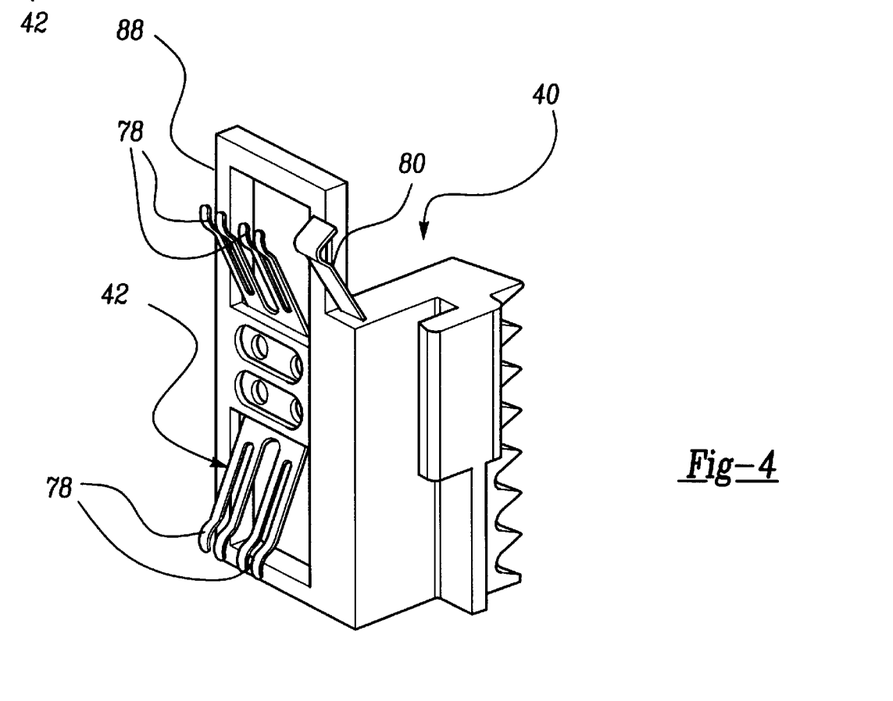
FIG. 4 is an assembled perspective view of the contactor and contactor carrier of FIG. 3.

Referring to FIG. 4, the contactor 42 is preferably insert-molded with the carrier 40, such that the frame 82 of the contactor 42 is encased by the frame 88 of the carrier 40. The contactor arms 78 and indexing arm 80 extend from the carrier 40 as shown.

Figure 5:
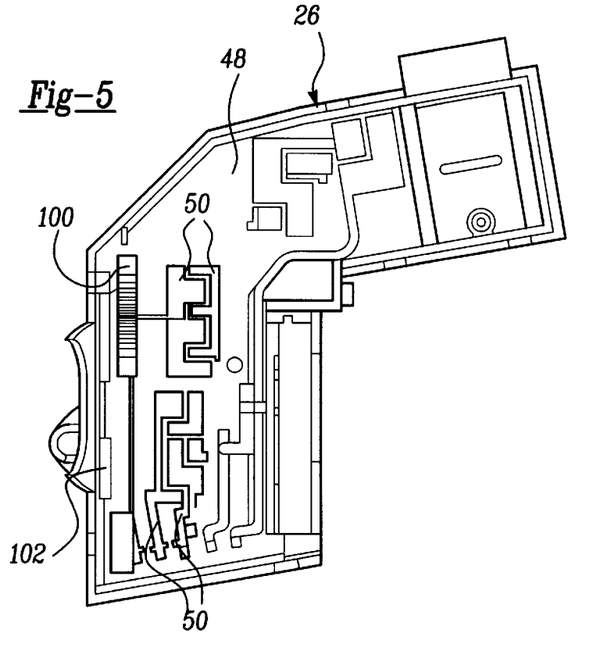
FIG. 5 illustrates the interior of the base of FIG. 1.

The interior surface 48 of the base 26 is shown more clearly in FIG. 5. The plurality of terminals 50 are insert molded with the base 26. Again, the specific shape, size and configuration of the terminals 50 may depend upon the particular application and is well within the skill of the art. A plurality of detents 100 are molded into the interior surface 48 of the base 26 adjacent the terminals 50. The base 26 further includes a rail 102 complementary to the guide 90 of the carrier 40 (FIG. 3).

Figure 6:
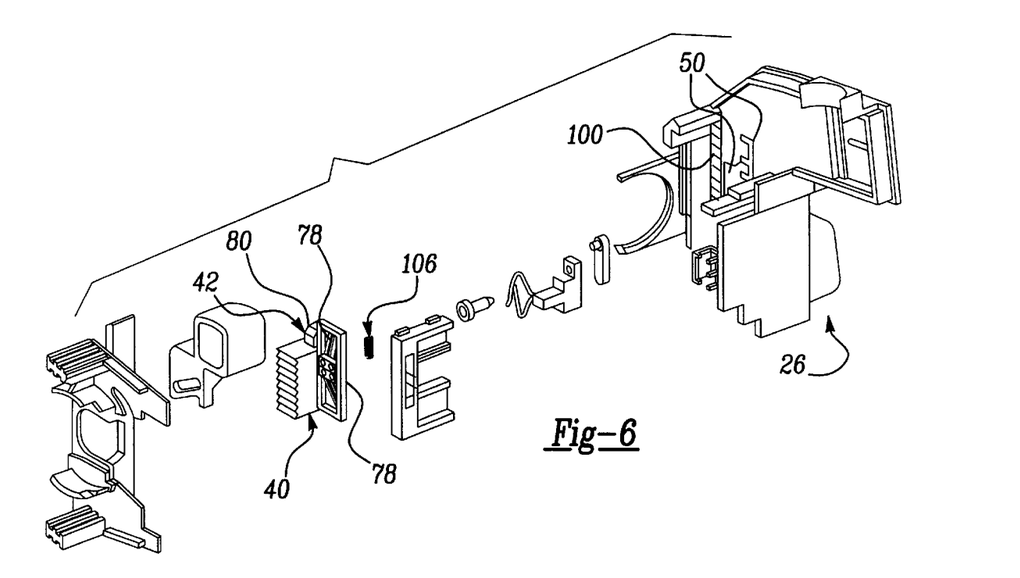
FIG. 6 is an exploded perspective view showing the contactor carrier and base.

The base 26 and carrier 40 are shown in an exploded perspective view in FIG. 6. As shown, a spring 106 for automatically returning the carrier 40 from one of its positions, such as a "mist" wiper function, may be biased against the carrier 40. The carrier 40 is aligned such that the indexing arm 80 of the contactor 42 is aligned with the detents 100 in the base 26. The contactor arms 78 are aligned with the terminals 50 in the base 26.

Figures 7, 8:
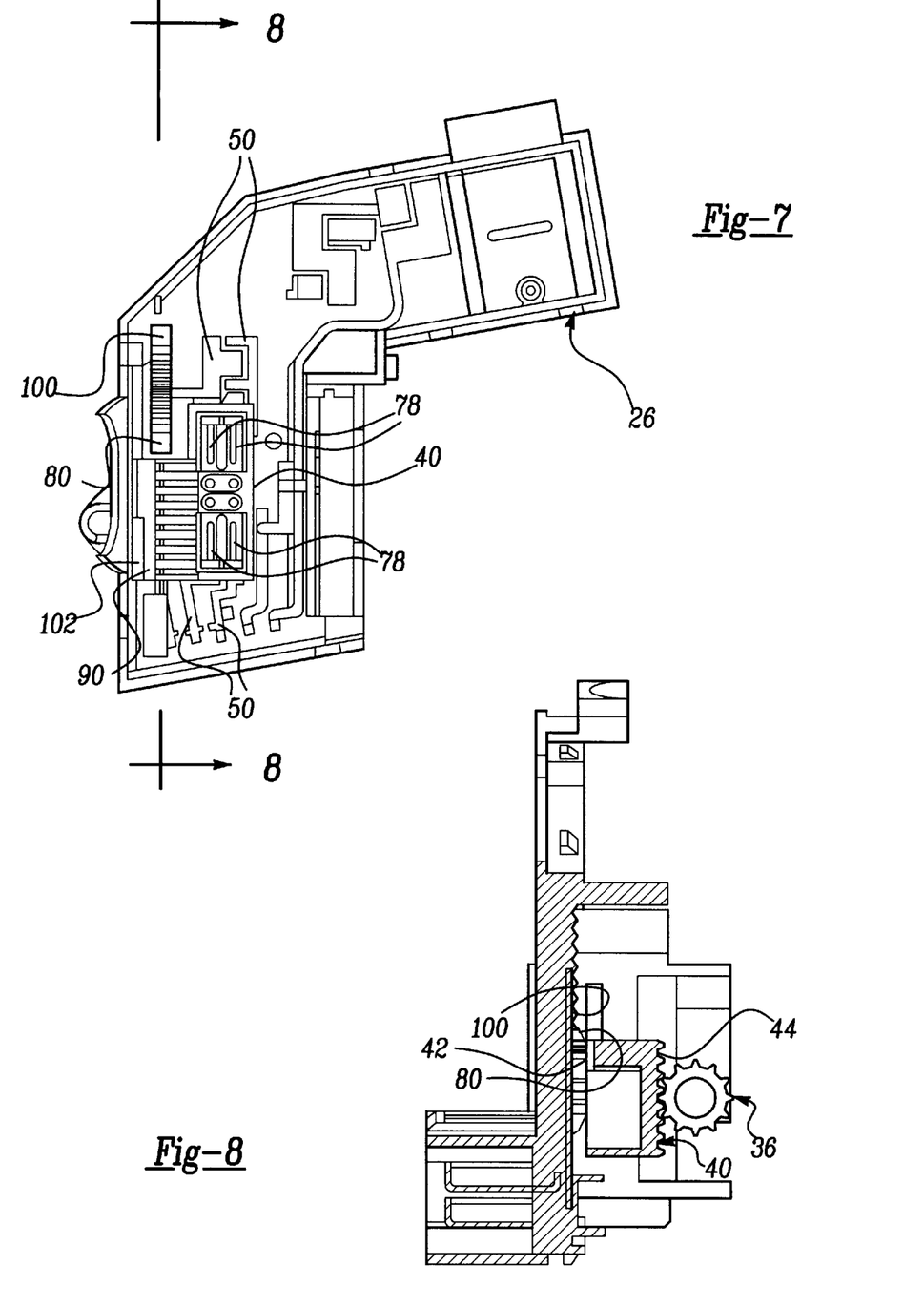
FIG. 7 is an assembled view of the contactor and base of FIG. 6.
FIG. 8 is a sectional view taken along 8—8 of FIG. 7.

In FIG. 7, the carrier 40 is assembled onto the base 26, with the rail 102 of the base 26 inserted into the guide 90 of the carrier 40. The indexing arm 80 of the contactor 42 contacts the detents 100 in the base 26. The contactor arm 78 contacts the terminals 50 in the base 26.

As can be seen in FIG. 8, the gear 36 engages the rack 44 of the carrier 40 to linearly displace the carrier and metal contactor 42. The indexing arm 80 is disposed in one of the detents 100 and upon rotation of the gear 36 (and displacement of the carrier 40) is moved sequentially among the detents 100.

Figure 9:
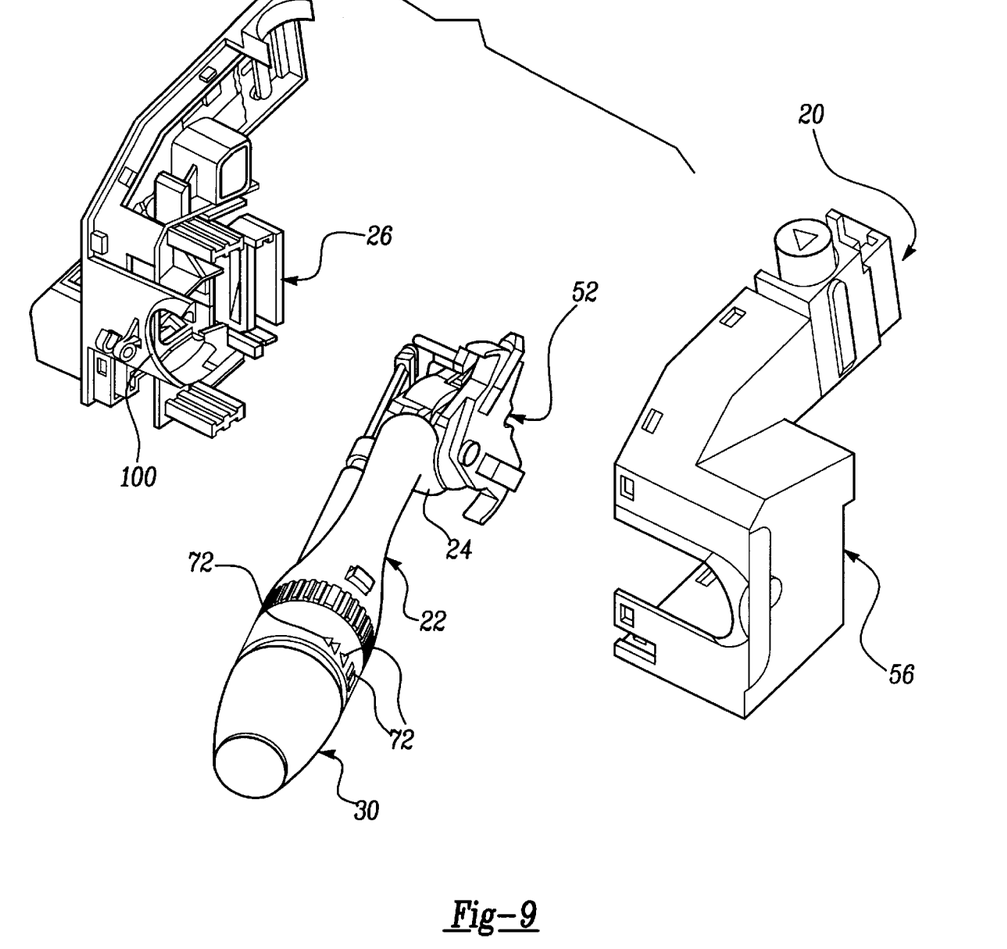
FIG. 9 is a partially exploded perspective view showing the assembly of the handle to the base.

Referring to FIG. 9, the inner end 24 of the handle 22 is mounted in the base 26, such that the gear 36 engages the rack 44 of the carrier 40. The housing 56 is then secured to the base 26, enclosing the inner end 24 of the handle 22 and the carrier 40.

In operation, upon rotation of the knob 30, each detent finger 56 in the knob 30 moves sequentially among the detents 70 in the control ring 62, while the indexing arm 80 of the contactor 42 on the carrier 40 also moves sequentially among the detents 100 in the base 26. The discrete rotational positions of the knob 30 correspond to each of the discrete linear position of the carrier 40 and the graphics 72 adjacent the knob 30 on the control ring 62. In other words, each of the detents 100 corresponds to one of the detents 70 for each of the detent fingers 66 and to one of the graphics 72. In each rotational position of the knob 30, there is a corresponding graphic 72, a detent 70 for each detent finger 66 in the control knob 30 and a detent 100 for the indexing arm 80.

With the secondary detent system for the carrier 40, the positional accuracy of the contactor arms 78 are improved relative to the rotational position of the knob 30 with respect to the graphic 72. Further since the indexing arm 80 is formed integrally with the contactor arms 78, the position of accuracy of the indexing arm 80 with respect to the contactor arm 78 is high. As a result, the potential for discrepancies between the vehicle function indicated by the graphics 72 and the actual function activated by the contactor 42 is reduced.

A typical detent plunger and compression spring could be utilized in place of the integral indexing arm 80 on the carrier 40. However, for the reasons stated above, the integral indexing arm 80 is preferred.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A multifunction switch assembly comprising:

a handle;

a rotatable knob mounted on said handle;

an electrical contactor having at least one contactor arm and an indexing arm;

an electrical terminal mounted in said assembly adjacent said contactor arm;

a plurality of first detents mounted in said assembly adjacent said indexing arm;

one of said contactor and said terminal operatively connected to said knob and being selectively displaced relative to the other by movement of said knob to selectively cause said contactor arm to make electrical contact with said terminal and said indexing arm to sequentially contact said plurality of first detents.

2. The multifunction switch assembly of claim 1 wherein rotational displacement of said knob selectively displaces said one of said contactor and said terminal linearly relative to the other.

3. The multifunction switch assembly of claim 1 further including a carrier, said electrical contactor insert molded with said carrier.

4. The multifunction switch assembly of claim 1 further including a carrier, said carrier secured to said one of said contactor and said terminal, said carrier selectively displaced by said movement of said knob.

5. The multifunction switch assembly of claim 4 wherein said carrier is displaced linearly by rotation of said knob.

6. The multifunction switch assembly of claim 4 wherein said carrier is displaced generally linearly by rotation of said knob.

7. The multifunction switch assembly of claim 6 further including a gear rotatably driven by said knob, said gear engaging teeth on said carrier.

8. The multifunction switch assembly of claim 7 further including a shaft mounted between said gear and said knob, a detent finger and a plurality of second detents disposed adjacent said knob, said detent finger sequentially moved among said plurality of second detents upon rotation of said knob, each of said plurality of first detents corresponding to one of said plurality of second detents such that said indexing arm is in each of said plurality of first detents when said detent finger is in a corresponding one of said second detents.

9. The multifunction switch assembly of claim 8 further including indicia adjacent said knob indicating one of a plurality of rotational positions of said knob, each of said rotational positions of said knob as indicated by said indicia corresponding to one of said first detents and one of said second detents such that said indexing arm is in said corresponding first detent and said detent finger is said corresponding said second detent when said corresponding position of said knob is indicated by said indicia.

10. The multifunction switch assembly of claim 1 wherein said contactor is selectively displaced relative to said terminal by movement of said knob to selectively cause said contactor arm to make electrical contact with said terminal and said indexing arm to sequentially contact said plurality of detents.

11. A multifunction switch assembly comprising:

a handle;

a rotatable knob mounted on said handle;

a shaft rotatably driven by said knob;

an electrical contactor having at least one contactor arm;

an electrical terminal mounted adjacent said contactor arm;

an indexing arm biased against a plurality of first detents, one of said detents and said indexing arm fixed with respect to said contactor, the other being fixed with respect to said terminal;

said contactor and said terminal displaced generally linearly relative to each other by rotation of said shaft to selectively cause said contactor arm to make electrical contact with said terminal and said indexing arm to sequentially contact said plurality of first detents.

12. The multifunction switch assembly of claim 11 further including a gear rotatably driven by said knob, said gear engaging teeth connected to said contactor.

13. A multifunction switch assembly including:

a handle;

a rotatable knob mounted on said handle;

a detent finger and a plurality of second detents disposed adjacent said knob, said detent finger sequentially moved among said plurality of second detents upon rotation of said knob;

a shaft rotatably driven by said knob;

an electrical contactor having at least one contactor arm;

an electrical terminal mounted adjacent said contactor arm;

an indexing arm biased against a plurality of first detents, one of said detents and said indexing arm fixed with respect to said contactor, the other being fixed with respect to said terminal;

said contactor and said terminal displaced relative to each other by rotation of said shaft to selectively cause said contactor arm to make electrical contact with said terminal and said indexing arm to sequentially contact said plurality of first detents, each of said plurality of first detents corresponding to one of said plurality of second detents such that said indexing arm is in each of said plurality of first detents when said detent finger is in a corresponding one of said second detents.

14. The multifunction switch assembly of claim 13 further including indicia adjacent said knob indicating one of a plurality of rotational positions of said knob, each of said rotational positions of said knob as indicated by said indicia corresponding to one of said first detents and one of said second detents such that said indexing arm is in said corresponding first detent and said detent finger is in said corresponding one of said second detents when said corresponding position of said knob is indicated by said indicia.

15. The multifunction switch assembly of claim 13 wherein said contactor is selectively displaced linearly relative to said terminal by movement of said knob to selectively cause said contactor arm to make electrical contact with said terminal and said indexing arm to sequentially contact said plurality of detents.

16. A multifunction switch assembly comprising:

a handle;

a rotatable knob mounted on said handle;

a shaft rotatably driven by said knob;

a gear secured to an inner end of said shaft;

a carrier having a rack complementary to said gear;

an electrical contactor secured to said carrier, said contactor having at least one contactor arm and an integral indexing arm;

an electrical terminal mounted adjacent said contactor arm;

a plurality of first detents mounted adjacent said indexing arm, said indexing arm biased against said first detents;

said carrier and said contactor displaced by rotation of said knob to selectively cause said contactor arm to make electrical contact with said terminal and said indexing arm to sequentially contact said plurality of first detents;

indicia adjacent said knob indicating one of a plurality of rotational positions of said knob, each of said rotational positions of said knob as indicated by said indicia corresponding to one of said first detents such that said indexing arm is in said corresponding first detent when said corresponding position of said knob is indicated by said indicia.

17. The multifunction switch assembly of claim 16 further including a detent finger and a plurality of second detents disposed adjacent said knob, said detent finger sequentially moved among said plurality of second detents upon rotation of said knob, each of said plurality of first detents corresponding to one of said plurality of second detents such that said indexing arm is in each of said plurality of first detents when said detent finger is in a corresponding one of said second detents.

* * * * *

UNITED STATES PATENT AND TRADEMARK OFFICE
CERTIFICATE OF CORRECTION

PATENT NO : 5,981,886
DATED : November 9, 1999
INVENTOR(S) : LeRoy A. Poleschuk et al It is certified that error appears in the above-identified patent and that said Letters Patent is hereby corrected as shown below:

Column 4, line 63, Claim 9: before "said corresponding said second detent" insert --in--.

Signed and Sealed this

Twenty-second Day of August, 2000

Attest:

Q. TODD DICKINSON

*Attesting Officer*     *Director of Patents and Trademarks*